United States Patent
Feiling et al.

(10) Patent No.: US 11,391,583 B2
(45) Date of Patent: Jul. 19, 2022

(54) NAVIGATION METHOD AND DEVICE

(71) Applicant: Dr. Ing. h.c. F. Porsche Aktiengesellschaft, Stuttgart (DE)

(72) Inventors: Jan Feiling, Stuttgart (DE); Tobias Grosse-Puppendahl, Herrenberg (DE); Hans-Georg Wahl, Renningen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 15/931,598

(22) Filed: May 14, 2020

(65) Prior Publication Data

US 2020/0363222 A1 Nov. 19, 2020

(30) Foreign Application Priority Data

May 16, 2019 (DE) .......................... 10 2019 112 922

(51) Int. Cl.
*G01C 21/34* (2006.01)
*G01C 21/36* (2006.01)

(52) U.S. Cl.
CPC ..... *G01C 21/3446* (2013.01); *G01C 21/3679* (2013.01); *G01C 21/3691* (2013.01)

(58) Field of Classification Search
CPC ............ G01C 21/3446; G01C 21/3679; G01C 21/3691; G01C 21/3484; G01C 21/3461; G01C 21/3476
See application file for complete search history.

(56) References Cited

U.S. PATENT DOCUMENTS

| | | | |
|---|---|---|---|
| 8,392,109 B2 | 3/2013 | Liotopoulos et al. | |
| 8,738,288 B2 | 5/2014 | Pfeifle et al. | |
| 2014/0088815 A1* | 3/2014 | Kitagishi | B60W 50/0098 |
| | | | 701/29.1 |
| 2015/0308846 A1* | 10/2015 | Ding | G06F 16/444 |
| | | | 701/424 |
| 2017/0052034 A1* | 2/2017 | Magazinik | G01C 21/3438 |
| 2017/0167885 A1 | 6/2017 | Adderly et al. | |
| 2017/0241793 A1 | 8/2017 | Raab | |
| 2017/0314949 A1 | 11/2017 | Rovik et al. | |
| 2018/0010920 A1 | 1/2018 | Poppen et al. | |
| 2018/0023969 A1 | 1/2018 | Poppen et al. | |
| 2018/0038704 A1 | 2/2018 | Nilsson et al. | |
| 2018/0164108 A1* | 6/2018 | Rahal-Arabi | G01C 21/3484 |

(Continued)

FOREIGN PATENT DOCUMENTS

| | | |
|---|---|---|
| DE | 102014205070 A1 | 9/2015 |
| EP | 1498863 A2 | 1/2005 |

(Continued)

*Primary Examiner* — Rami Khatib
(74) *Attorney, Agent, or Firm* — Leydig, Voit & Mayer, Ltd.

(57) ABSTRACT

A navigation method includes selecting a route from a multiplicity of routes, which connect a departure point for a navigation to a destination for the navigation. The route includes at least one route segment. The at least one route segment for the route is selected from a multiplicity of road sections. The road sections are each assigned at least one property, which characterizes a driving experience. A metric is evaluated in accordance with the at least one property of a respective road section of the road sections. The route whose road sections maximize the metric as route segments for the route is selected.

13 Claims, 2 Drawing Sheets

(56) References Cited

U.S. PATENT DOCUMENTS

2018/0178807 A1* 6/2018 Murata ................. B60W 30/10
2019/0346276 A1* 11/2019 Jackson ................. G06Q 40/08
2020/0173801 A1* 6/2020 Hamagami .......... G08G 1/0141
2020/0284601 A1* 9/2020 Myers ................. G01C 21/3484
2020/0284603 A1* 9/2020 Sumikawa ............ B60W 40/09

FOREIGN PATENT DOCUMENTS

| WO | WO 9305492 A1 | 3/1993 |
| WO | WO 2011159340 A2 | 12/2011 |

* cited by examiner

NAVIGATION METHOD AND DEVICE

CROSS-REFERENCE TO PRIOR APPLICATIONS

Priority is claimed to German Patent Application No. DE 10 2019 112 922.2, filed on May 16, 2019, the entire disclosure of which is hereby incorporated by reference herein.

FIELD

The invention relates to a navigation method and device, in particular for a vehicle.

BACKGROUND

WO 9305492 A1 discloses acquiring driving states of a motor vehicle, for example the speed, the lateral acceleration, the inclination, the deceleration and/or the acceleration of the motor vehicle and transmitting them/it to a unit which makes available cornering data for cornering-optimized route planning from the acquired data. The cornering-optimized route planning can contain the largest possible number of bends which provide a driver of a motor vehicle with the highest possible driving enjoyment.

Documents DE 102014205070 A1, US 2018023969 A1, US 2018010920 A1, US 2018038704 A1, US 2017241793A1, US 2017314949 A1, US 2017167885 A1, U.S. Pat. No. 8,738,288B2, WO 2011159340 A2, U.S. Pat. No. 8,392,109 B2 and EP 1498863 A2 describe further methods and devices, wherein map material used for navigation can be expanded with information relating to the driving experience.

SUMMARY

An embodiment of the present invention provides a navigation method that includes selecting a route from a multiplicity of routes, which connect a departure point for a navigation to a destination for the navigation. The route includes at least one route segment. The at least one route segment for the route is selected from a multiplicity of road sections. The road sections are each assigned at least one property, which characterizes a driving experience. A metric is evaluated in accordance with the at least one property of a respective road section of the road sections. The route whose road sections maximize the metric as route segments for the route is selected.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
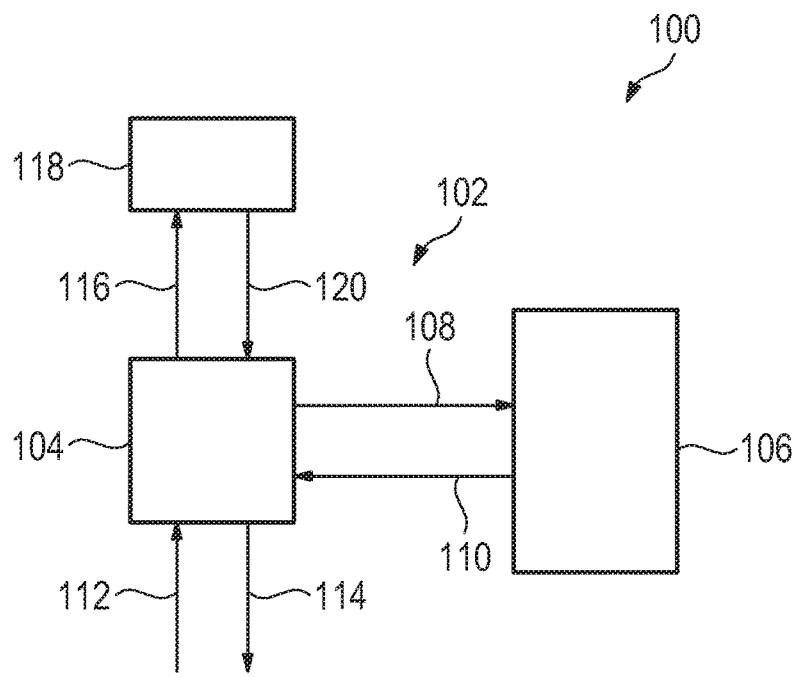
FIG. 1 shows a schematic view of a navigation system.

Embodiments of the present invention make available driving-experience-based navigation, which is improved in comparison with the above.

A navigation method, according to an embodiment of the present invention, provides that a route is selected from a multiplicity of routes, which connect a departure point for a navigation to a destination for the navigation, in particular in accordance with a desired arrival time and/or departure time. The route includes at least one route segment. The at least one route segment for the route is selected from a multiplicity of road sections. The road sections are each assigned at least one property that characterizes a driving experience. A metric is evaluated in accordance with the properties of the road section. The route whose road sections maximize the metric as route segments for the route is selected. Vehicle-related navigation is influenced with respect to the driving experience of the users. The calculation of routes is carried out on the basis of a driving experience map in which the multiplicity of road sections is stored. The optimum route is found in order to influence driving experiences positively.

The road sections are preferably assigned a multiplicity of properties. The properties are assigned respective weightings with which the properties in the metric are taken into account. The metric is preferably a sum of properties which is weighted with the respective weightings.

The at least one property preferably characterizes a static property, a dynamic, in particular time-dependent, property, a personalized property, and/or a swarm-data-based property.

The at least one property preferably characterizes a physical property of the respective road section, a physical property of an area surrounding the vehicle or of the respective road section, a physical property of a component of the vehicle, information about a driver of the vehicle, abstracted information about properties for a multiplicity of vehicles or drivers, information about a measurement variable of a sensor which is arranged on the vehicle or on the driver, or information from a camera which is arranged on the vehicle and/or information from a database, in particular from a social network. Various expansion stages make it possible to classify driving experience levels in accordance with vehicle signals, camera signals and/or signals of wearables.

There is preferably a provision that at least one of the properties for a road section is learned in accordance with information about a route segment that characterizes a driving experience. Therefore, map information is generated with experience-based weighting.

An enquiry about possible route segments is preferably transmitted, wherein the enquiry includes information about the departure point and/or the destination. An enquiry is therefore integrated into a server as a backend.

At least one road section, which is selected from the multiplicity of the road sections, is preferably transmitted with its at least one property. Therefore, access is made to map information of a server as a backend.

The navigation device includes a route calculation apparatus, which is designed to select a route from a multiplicity of routes that connect a departure point for a navigation to a destination for the navigation. The route includes at least one route segment. The at least one route segment for the route is selected from a multiplicity of road sections. The road sections are each assigned at least one property, which characterizes a driving experience. A metric is evaluated in accordance with the properties of the road section, and the route whose road sections maximize the metric as route segments for the route is selected.

The system includes the navigation device and a server, which is designed to receive an enquiry about possible route segments. The enquiry includes information about the departure point and/or the destination. The system is also configured to transmit at least one road section, selected from the multiplicity of road sections, with its at least one property. The system, with the server as a backend, stores highly sensitive data, for example image, video, location data, locally in the route calculation apparatus and trains person-related models, which can profit from swarm data, i.e. the person-related models other users in an anonymized fashion, in order to increase the navigation performance significantly.

Further advantageous refinements emerge from the following description and the drawings.

FIG. 1 shows a schematic view of a navigation system 100.

The system 100 includes a navigation device 102 (also referred to herein as a navigator).

The device 102 includes a route calculation apparatus 104 (also referred to herein as a route calculator) and a server 106 as a backend.

The server 106 can be implemented distributed among a plurality of pieces of equipment so that a local backend and a remote backend are provided.

Both the local backend and the remote backend can include segment IDs for road sections. The segment IDs are used for example to define a route, as follows:

{Segment ID, linking segment IDs}.

Therefore road sections of a route or of a possible route, which connect directly to one another, can be identified directly from a multiplicity of routes.

The local backend can additionally include geometric data for road sections, for example a measure of curvature, possible speed, quality of the road.

The local backend can additionally include personalized data for road sections, for example information on favored route types or routines.

The remote backend can include not only the segment IDs but also geo-based properties, for example country-specific properties.

The remote backend can include not only the segment IDs, but also global user preferences, i.e. anonymized user preferences, for example routes that are often traveled along, route evaluations, driving style, type of vehicle.

The remote backend can include not only the segment IDs, but also image data, for example external cameras or media.

These are assigned for example as map information to the segment IDs.

The route calculation apparatus 104 is designed to select a route in accordance with map information from a multiplicity of routes, which connect a departure point for a navigation to a destination for the navigation.

In the example, the route calculation apparatus 104 is designed to transmit an enquiry 108 about possible road sections to the backend in accordance with a starting location and/or a destination and/or a desired arrival time.

In the example, the backend is designed to transmit possible road sections together with their respective property in a response 110 to the route calculation apparatus 104.

In the example, the route calculation apparatus 104 is designed to transmit the enquiry 108 after an enquiry 112 by a user. In the example, the route calculation apparatus 104 is designed to output a route with a maximized experience value, which also satisfies boundary conditions in the example, to the user in an output 114.

In the example, the route calculation apparatus 104 is designed to transmit a region-dependent enquiry 116 to a service provider 118, which transmits, for example, information about the weather, congestion or traffic density and/or events in a response 120 to the route calculation apparatus 104. In this case, this information is taken into account in the calculation of routes.

The route with the maximized experience value includes at least one route segment. The at least one route segment for the route is selected, as described below, from a multiplicity of road sections.

In the following description, the term driving experience is defined, in particular, by experiences. An experience provides the basis for the following consideration: "The experience is an event in the individual life of a person which differs greatly from the everyday reality of the experiencing person in such a way that it remains in their memory for a long time". A driving experience is therefore composed of the following exemplary components:

1. Driving experience: Driving over a route which brings about a positive experience. This includes aspects such as vehicle-specific properties (for example soft top, sports car, performance), speed, cornering, surroundings (nature, large city, . . . ), rich variety, quality of the road, weather and time of year, time of day and time of night, exclusivity.
2. Points of interests/hot spots: A driving experience is usually not limited to the vehicle but also contains apart from the driving also brakes which can be spent, for example, in particular restaurants, hotels or at particular sites. In addition, services can enrich the driving experience, such as for example the provision of bicycles for sporting activity at a POI. However, POIs can also be experienced during driving by driving past sites, for example.

The following aspects of a driving experience are decisive for a driver:

1. Roads and roadway: rich variety and lateral dynamics, positive gradients, negative gradients, quality of the roadway, length and duration, mental strain, speed, acceleration and deceleration, predictability, safety;
2. Weather and time of year: Connected with this is the coefficient of friction between the roadway surface and tires, possible intermediate medium such as snow or foliage;
3. Traffic: In particular quantity, possibilities of overtaking, traffic flow generally;
4. Surroundings: Nature, town, beauty, sites, altitude information, vegetation, population density;
5. Safety: Safety from physical integrity, sensed safety, social aspects; and
6. Dwell time: Time and duration at a time or section The road sections are each assigned at least one property, which characterizes the driving experience on this road section. The properties in the example characterize, in particular, a physical property of the respective road section, a physical property of an area surrounding the vehicle or of the respective road section, a physical property of a component of the vehicle, information about a driver of the vehicle, abstracted information about properties for a multiplicity of vehicles or drivers, information about a measurement variable of a sensor, which is arranged on the vehicle or on the driver, or information from a camera which is arranged on the vehicle, and/or information from a database, in particular from a social network.

Figure 2:
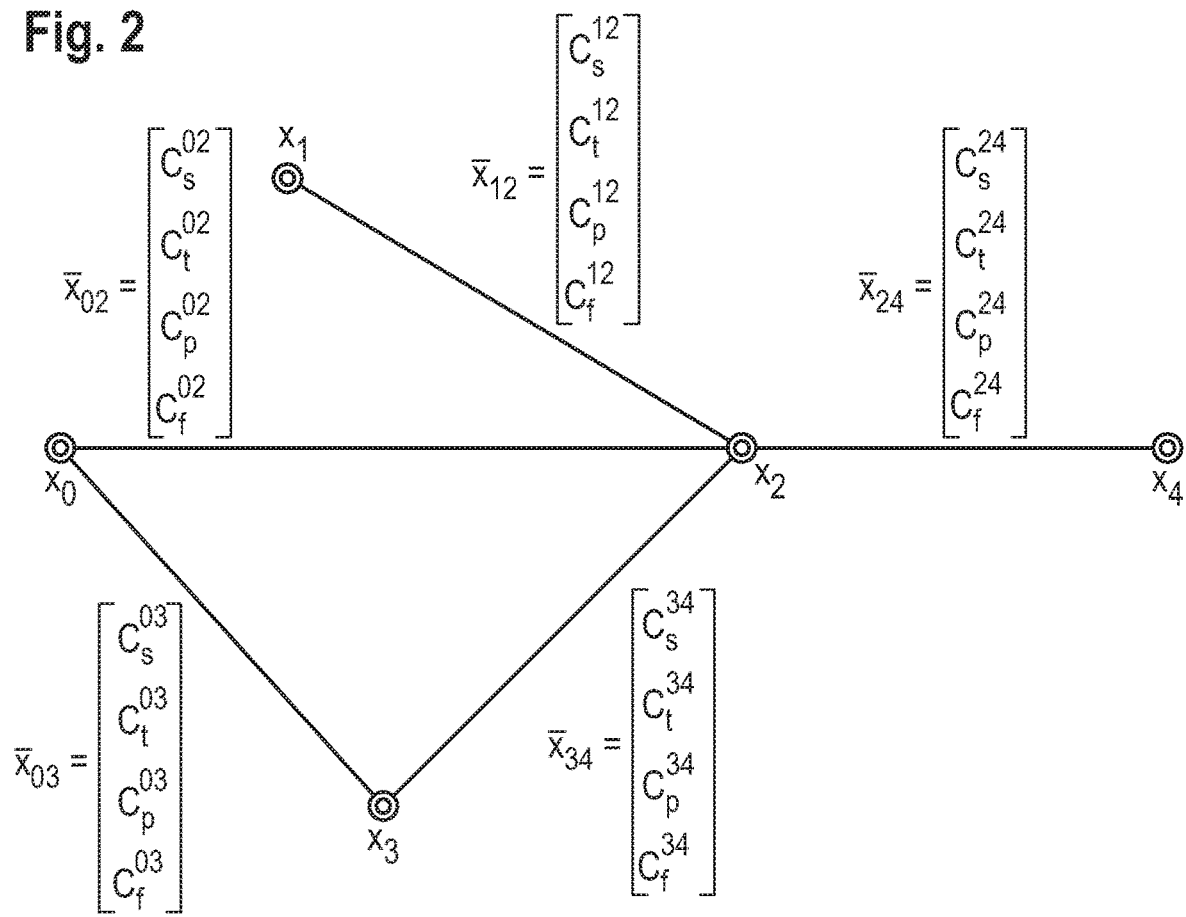
FIG. 2 shows a schematic view of the road segments with property vectors.
Figure 3:
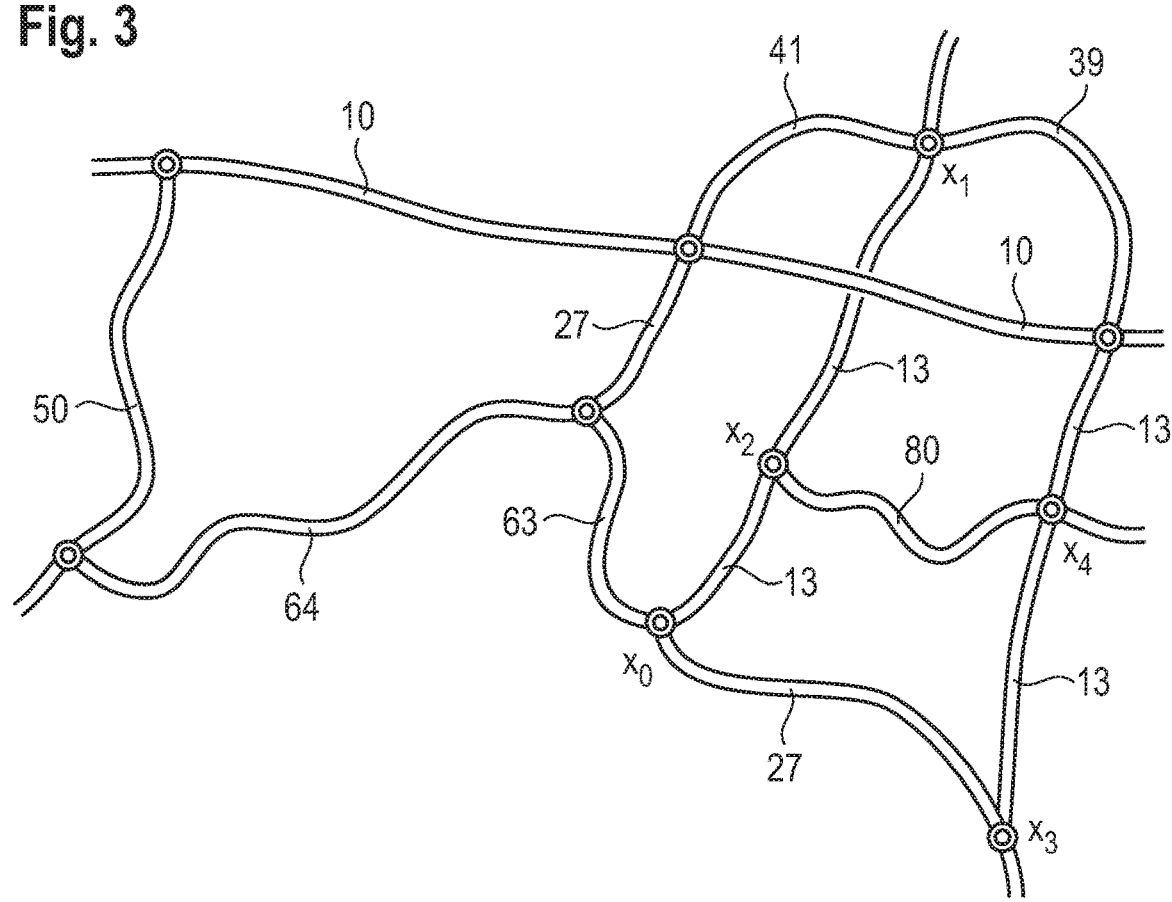
FIG. 3 shows a schematic view of a driving experience map.

FIG. 2 shows a schematic view of road segments with property vectors which can be used to generate a driving experience map illustrated schematically in FIG. 3.

Road sections $\overline{x}_{ij}$ where $i \neq j$ connect route points $x_i$ and $x_j$, where $x_i = [lat_i, lon_i]$ represent the position in coordinates, for example of the Global Positioning System GPS. In the example, the road sections are each assigned four properties which characterize a driving experience as property vectors:

$$\overline{x}_{ij} = \begin{bmatrix} c_s^{ij} \\ c_t^{ij} \\ c_p^{ij} \\ c_f^{ij} \end{bmatrix}$$

where $c_s$ characterizes a static property, $C_t$ characterizes a dynamic, in particular time-dependent, property, $C_p$ characterizes a personalized property, and $C_f$ characterizes a swarm-data-based property.

Properties are defined in the example as follows:

Static: curvature, positive gradient, maximum speed, road class, demands made of the vehicle.

Dynamic: weather, state of road, traffic density.

Personalized: vehicle sensor system, preferences with respect to speed, mountain passes or bends determined from vehicle data, preferences determined via social networks, working routines or leisure time routines, deadlines, favored regions, camera data, vital sensor system, i.e. wearables.

Swarm data or fleet data: location-based properties, similarities between users, camera data, vehicle sensor system, location-based information from social networks.

The driving experience map from FIG. 3 is determined, for example, for the route points $x_0$, $x_1$, $x_2$, $x_3$ and $x_4$ from FIG. 2 on the basis of the respective property vectors. The road sections are each allocated, for example, points between 0 for a negative driving experience and 100 for a positive driving experience. These are calculated, for example, for each user by means of a simulation and are adapted and personalized by collecting data. Properties are weighted differently for each user. The same procedure is used for the other route points and road sections.

In order to calculate these driving experience values it is possible to provide not only a simulation but also the inclusion of user-based preferences, of adaptive user-based information and/or of fleet data. In particular it is possible to expand the driving experience map on the basis of swarm data. Decentralized multi-task learning is preferably applied, during which local models are trained in the route calculation apparatus 104 of individual vehicles, the locally trained models are linked to one another by the server 106 of different vehicles, in order to update a decentralized model, and the updated decentralized model is made available to the vehicles as a local model for the next training step. Sensitive data cannot be exchanged in this context.

The route calculation apparatus 104 is designed to evaluate a metric in accordance with the properties of the road sections in order to select the route whose road sections maximize the metric as route segments for the route.

The metric includes, for example, a weighted total. The corresponding optimization problem has the object specifying the route $\overline{x}$ for:

$$\overline{x} = \max_{x_{ij}} \Sigma\, F(x_{ij})$$

with the metric:

$$F(x_{ij}) = g_s C_s^{ij} + g_t C_t^{ij} + g_p C_p^{ij} + g_f C_f^{ij}.$$

In addition, the following boundary conditions are used:
$x_0$ departure point of the navigation,
$x_T$ destination of the navigation,
road segments $x_{ij}$ are connected.

The following conditions are preferably also used:
arrival time≤desired arrival time,
road sections $x_{ij}$ are traveled along only once,
each of the road sections $x_{ij}$ is traveled along in only one direction.

The route calculation apparatus 104 is designed to solve this complex optimization problem. The associated route segments are searched for so that the driving experiences are maximized on the basis of the generated driving experience map according to FIG. 2 and the arrival time corresponds to less than or equal to the desired arrival time. In this context, the boundary conditions such as the departure point and destination as well as the one-off travel along a segment during the route are complied with.

The parameter vectors $g_s$, $g_t$, $g_p$, $g_f$ with which the properties are weighted are different from user to user and can be predefined partially by the user himself or learnt by the system.

The route calculation apparatus 104 is designed to locally store data, such as for example the image, video, location data. The route calculation apparatus 104 is designed to access map information of the server 106 as a backend.

The navigation method provides for one route to be selected from a multiplicity of routes which connect a departure point for a navigation to a destination for the navigation.

The route includes at least one route segment, which is selected from a multiplicity of road sections. The road sections are each assigned at least one of the properties which characterizes the driving experience. The metric is evaluated in accordance with the properties of the road section and the route whose road sections maximize the metric as route segments for the route is selected. Standardization to the number of route segments is preferably also carried out for the selection of the route.

The user interaction with the system can take place in a multi-modal fashion, for example by means of a center display, head-up display, a smartphone or by means of a dialog, for example in a vehicle, on a smartphone or on a home assistant.

In order to initialize the navigation it is possible to provide the following:
a. an explicit navigation enquiry:
 i. the user selects a navigation destination or specifies a multi-day route and selects the type of navigation which he prefers, for example the fastest route, the route which is optimized in terms of driving experience, or the shortest route,
 ii. the user can optionally specify a time factor, for example to what extent the arrival can be delayed in comparison with the shortest route. In this context, the following cases are differentiated in the example:
  1. Desired arrival time<possible arrival time: fastest possible route is calculated and the driving experience cannot be taken into account or can only be taken into account to a small extent.

2. Desired arrival time>possible arrival time: the route is calculated on the basis of the personalized driving experience value which is supported with swarm data, and in this context an optimum route is calculated in order to maximize this value and in order to fulfil the desired arrival time.
iii. The user can optionally specify a focus of the route, for example by means of sliding controllers for the curvature, beauty, etc. Alternatively, predefined profiles, in particular personal profile, sporty profile, soft top profile, can also be selected. This includes further input parameters such as e.g. the region, towns, type of experience, in particular lake, mountains, gulf, . . . , number of days, kilometers traveled, time in the car, which are included in the calculation of the optimum route with respect to the determined personalized driving experience value which is supported by swarm data.
b. an implicit navigation enquiry:
i. If the navigation destination predicts, for example, travel to work or home, a proposal can be issued for a route which is optimized in terms of driving experience.
ii. Implicitly comparison can be carried out with the calendar in order to determine the timing factor automatically.
iii. The user can then carry out the steps in a. explicitly.

For the selection of the route it is possible to provide that after the calculation of possible routes on the basis of the driving experience value the user can select them explicitly or can bring about their selection implicitly.

In addition there can be provision that bookings are made for POIs, multistory car parks, reservations for charging stations for the selected route.

The following can be provided for the navigation:
a. For each driving section, hot spot or POI the driver is provided with additional information, for example a focus on the driving experience on the route section.
b. Possible alternatives are calculated regularly during the entire journey, in order to include dynamic parameters, in particular weather, traffic etc. In this way, the route can be adapted explicitly or implicitly.

In addition there can be provision that bookings for POIs, multistory car parks, reservations are adapted, for example on explicit request or automatically.
c. On the basis of the route section, the user can then set vehicle parameters with automatic proposals which are based on the driving experience values, for example sporty mode, shock absorber, manual gear shift, gear shift suggestion before bends.

Figure 4:
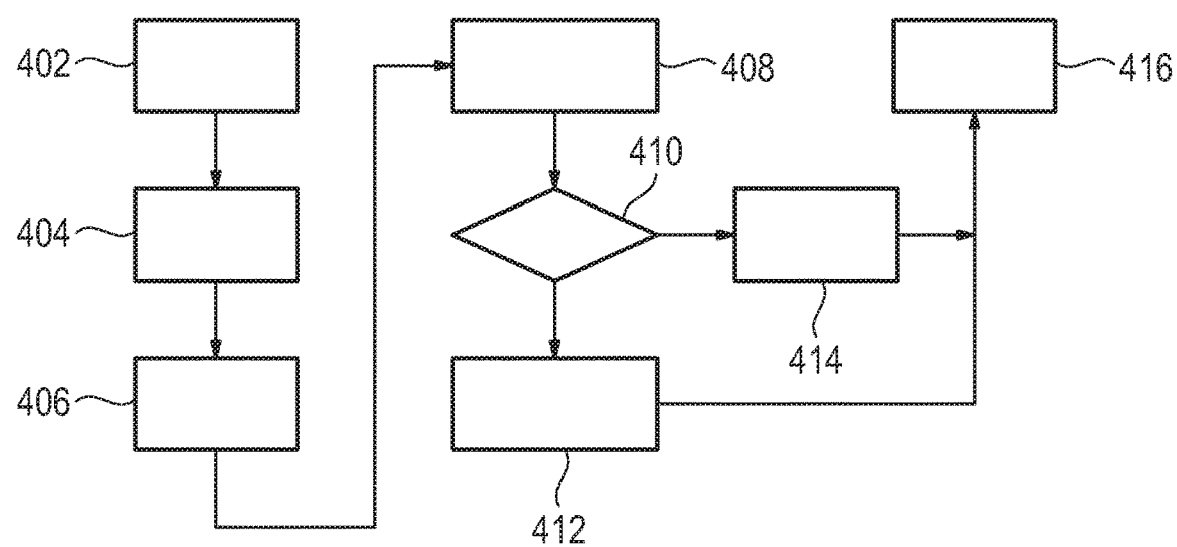
FIG. 4 shows a schematic view of a flow diagram with the steps from a navigation method.

The method which is illustrated in FIG. 4 provides in this respect a step 402.

In step 402, a user input for a destination $x_T$ is made.
Subsequently, a step 404 is executed.
In step 404, the fastest route is calculated.
A step 406 is subsequently executed.
In step 406, an arrival time T is output to the user.
Subsequently, a step 408 is executed.
In step 408, a user input with the desired arrival time T* and, if appropriate, a selection of one of the options, for example coast, mountain pass etc., is made.
Subsequently a step 410 is executed.
In step 410, checking is carried out to determine whether the desired arrival time T* is later than the arrival time T for the shortest route.
If the desired arrival time T* is later than the arrival time T, a step 412 is executed. Otherwise a step 414 is executed.

In step 412, a route with a maximum experience value which complies with the boundary conditions is calculated and defined for the navigation.
Subsequently a step 416 is executed.
In step 414, the fastest route for the navigation is defined.
Subsequently the step 416 is executed.
In step 416, a user input is interrogated for starting the navigation.
The navigation starts with the defined route if the user confirms the user input in order to start the navigation.
The method ends if the navigation ends after the result of the destination being reached or as a result of a user input to abort the navigation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:
1. A navigation method performed by a vehicle navigation system, the navigation method comprising:
automatically selecting a route from a multiplicity of routes, which each connect a departure point for a navigation to a destination for the navigation,
wherein each of the routes respectively comprises one or more route segments, and
wherein the one or more route segments for each of the routes is selected from a multiplicity of road sections,
wherein the selecting the route comprises:
assigning each of the road sections a multiplicity of properties, comprising at least one property which characterizes a driving experience, wherein the properties are respectively assigned weights;
evaluating a metric in accordance with the respective properties and the respective weights associated with one or more of the respective road sections; and
selecting as the route, the route having the one or more respective road sections, selected as the one or more route segments, that results in maximizing an optimization problem operating on the metric; and outputting the selected route to an electronic display, wherein the optimization problem is defined as:

$$\bar{x} = \max_{x_{ij}} \sum F(x_{ij})$$

wherein $F(x_{ij})$ is the metric, wherein $\bar{x}$ is the one or more respective road sections selected for the one or more route segments for the selected route, wherein $x_{ij}$ is the respective one or more road sections connecting the departure point to the destination, and wherein the optimization problem is executed to determine which one from a plurality of sets of the respective one or more road sections $x_{ij}$ connecting the departure point to the destination point corresponds to the maximum.

2. The method as claimed in claim 1, wherein the properties comprise at least one of: a static property, a dynamic property, a personalized property, or a swarm-data-based property.

3. The method as claimed in claim 2, wherein the properties comprise the dynamic property, which is a time-dependent property.

4. The method as claimed in claim 1, wherein the properties comprise at least one of:
a physical property of the respective road section, of the road sections,
a physical property of an area surrounding a vehicle or of the respective road section,
a physical property of a component of the vehicle,
information about a driver of the vehicle,
abstracted information about properties for a multiplicity of vehicles or drivers,
information about a measurement variable of a sensor, which is arranged on the vehicle or on the driver,
information from a camera, which is arranged on the vehicle, or
information from a database.

5. The method as claimed in claim 4, wherein the at least one property characterizes the information from the database that corresponds to a social network.

6. The method as claimed in claim 1, the method comprising using decentralized multi-task learning to determine at least one of the properties for a respective one of the road sections in accordance with information about a route segment, of the one or more route segments, which characterizes the driving experience.

7. The method as claimed in claim 1, the method comprising transmitting an enquiry about possible route segments, wherein the enquiry comprises information about at least one of the departure point or the destination.

8. The method as claimed in claim 1, the method comprising transmitting at least one road section, which is selected from the multiplicity of road sections, with the corresponding at least one property.

9. The method as claimed in claim 1, wherein the selecting of the route from the multiplicity of routes, which connect the departure point for the navigation to the destination for the navigation, is performed to additionally satisfy a constraint of a desired arrival time or a desired departure time.

10. The method as claimed in claim 1,
wherein $F(x_{ij}) = g_s C_s^{ij} + g_t C_t^{ij} + g_p C_p^{ij} + g_f C_f^{ij}$, wherein the weights comprise: $g_s$, which is a weight for a static property, $g_t$, which is a weight for a dynamic property, $g_p$, which is weight for a personalized property, and $g_f$, which is a weight for a swarm-data-based property, and wherein the properties for the respective one or more road sections $x_{ij}$ comprise: $C_s^{ij}$, which characterizes the static property, $C_t^{ij}$, which characterizes the dynamic property, $C_p^{ij}$, which characterizes the personalized property, and $C_f^{ij}$, which characterizes the swarm-data-based property.

11. The method as claimed in claim 1, wherein representations of the properties and the weights are determined using decentralized multi-task learning.

12. A navigation device, comprising a route calculator in communication with an electronic display, configured to:
select a route from a multiplicity of routes, which each connect a departure point for a navigation to a destination for the navigation,
wherein each of the routes respectively comprises one or more route segments,
wherein the one or more route segments for each of the routes is selected from a multiplicity of road sections, and
wherein the navigation device is configured to select the route by:
assigning each of the road sections a multiplicity of properties, comprising at least one property which characterizes a driving experience, wherein the properties are respectively assigned weights,
evaluating a metric in accordance with respective properties and the respective weights associated with one or more of the respective road sections, and
selecting as the route, the route having the one or more respective road sections, selected as the more or more route segments, that results in maximizing an optimization problem operating on the metric; and display the selected route on the electronic display, wherein the optimization problem is defined as:

$$\bar{x} = \max_{x_{ij}} \sum F(x_{ij})$$

wherein $F(x_{ij})$ is the metric,
wherein $\bar{x}$ is the one or more respective road sections selected for the one or more route segments for the selected route,
wherein $x_{ij}$ is the respective one or more road sections connecting the departure point to the destination, and
wherein the optimization problem is executed to determine which one from a plurality of sets of the respective one or more road sections $x_{ij}$ connecting the departure point to the destination point corresponds to the maximum.

13. A system comprising a server in communication with a navigation computer, the system being configured to:
receive, by the server, an enquiry about possible route segments, wherein the enquiry comprises information about at least one of a departure point or a destination, and transmit, by the server to the navigation computer, a plurality of road sections, selected from a multiplicity of road sections, a multiplicity of properties respectively assigned to the plurality road sections, and weights respectively assigned to the properties, automatically select a route from a multiplicity of routes, each of the routes connecting the departure point to the destination for a navigation, each of the routes respectively comprising one or more route segments of the possible route segments, the one or more route segments comprising the plurality of road sections;

wherein automatically selecting the route comprises:

evaluating a metric in accordance with the respective properties and the respective weights associated with the plurality of road sections; and selecting as the route, the route having the respective one or more of the road sections, selected as the one or more route segments, that results in maximizing an optimization problem operating on the metric; and wherein the optimization problem is defined as:

$$\bar{x} = \max_{x_{ij}} \sum F(x_{ij})$$

wherein $F(x_{ij})$ is the metric, wherein $\bar{x}$ is the one or more respective road sections selected for the one or more route segments for the selected route, wherein $x_{ij}$ is the respective one or more road sections connecting the departure point to the destination, and wherein the optimization problem is executed to determine which one from a plurality of sets of the respective one or more road sections $x_{ij}$ connecting the departure point to the destination point corresponds to the maximum.

* * * * *